(12) United States Patent
Coulombe et al.

(10) Patent No.: US 8,769,847 B2
(45) Date of Patent: Jul. 8, 2014

(54) FRAME ASSEMBLY FOR COUPLING AN IMPLEMENT TO A VEHICLE

(75) Inventors: Alexandre Coulombe, Saint-German de Grantham (CA); Normand Roy, St-Hugues (CA); Marc-Andre Patry, Drummondville (CA); Vincent Morin, Drummondville (CA); Jeremie Aubin-Marchand, St-Hugues (CA); Erick Bienvenue, Sherbrooke (CA)

(73) Assignee: Soucy International Inc., Drummondville (CA)

( * ) Notice: Subject to any disclaimer, the term of this patent is extended or adjusted under 35 U.S.C. 154(b) by 263 days.

(21) Appl. No.: 13/184,081

(22) Filed: Jul. 15, 2011

(65) Prior Publication Data

US 2012/0187263 A1    Jul. 26, 2012

Related U.S. Application Data

(60) Provisional application No. 61/365,077, filed on Jul. 16, 2010.

(51) Int. Cl.
    *E01H 5/04*    (2006.01)

(52) U.S. Cl.
    USPC ............. 37/231; 37/235; 172/275; 172/817

(58) Field of Classification Search
    USPC ............ 37/231, 232, 235; 172/817, 272, 275
    See application file for complete search history.

(56) References Cited

U.S. PATENT DOCUMENTS

| | | | | |
|---|---|---|---|---|
| 3,987,562 A * | 10/1976 | Deen et al. | | 37/231 |
| 4,976,053 A * | 12/1990 | Caley | | 37/231 |
| 5,031,927 A * | 7/1991 | Frenette | | 280/481 |
| 5,244,047 A * | 9/1993 | Eudy | | 172/275 |
| 6,145,222 A * | 11/2000 | Curtis | | 37/231 |
| 6,170,178 B1 * | 1/2001 | Christy | | 37/231 |
| 6,295,892 B1 * | 10/2001 | Roy et al. | | 74/532 |
| 6,334,269 B1 * | 1/2002 | Dilks | | 37/235 |
| 6,526,677 B1 * | 3/2003 | Bloxdorf et al. | | 37/231 |
| 6,594,924 B2 * | 7/2003 | Curtis | | 37/231 |
| 6,615,513 B2 * | 9/2003 | Quenzi et al. | | 37/231 |
| 6,634,588 B1 * | 10/2003 | Jackson | | 242/323 |
| 6,711,837 B2 * | 3/2004 | Bloxdorf et al. | | 37/231 |
| 6,843,002 B1 * | 1/2005 | Moffitt | | 37/231 |
| 6,928,757 B2 * | 8/2005 | Bloxdorf et al. | | 37/231 |
| 6,957,505 B1 * | 10/2005 | Moffitt | | 37/231 |
| 6,964,121 B2 * | 11/2005 | Harris | | 37/231 |
| 7,103,995 B2 * | 9/2006 | Curtis | | 37/231 |
| 7,219,453 B2 * | 5/2007 | Baker | | 37/232 |
| 7,334,357 B1 * | 2/2008 | Altheide | | 37/231 |
| 7,526,883 B2 * | 5/2009 | Musso et al. | | 37/231 |
| 7,574,820 B2 * | 8/2009 | Musso et al. | | 37/270 |
| 7,836,613 B2 * | 11/2010 | Koch et al. | | 37/231 |

(Continued)

*Primary Examiner* — Bradley Duckworth

(74) *Attorney, Agent, or Firm* — Brouillette & Partners; Francois Cartier; Robert Brouillette

(57) ABSTRACT

A support frame assembly for supporting a plow, or another front-mounted implement, on a small vehicle such as an all-terrain vehicle ("ATV") is provided. The frame assembly comprises a front portion and a rear portion. The front portion is typically raised with respect to the rear portion, allowing the plow to be pivotally attached to the front of the frame assembly at a higher location. The rear portion comprises a locking mechanism allowing the frame assembly to be easily mounted to the underside of the vehicle. A releasing mechanism, operatively connected to the locking mechanism, allows for the easy removal of the frame assembly from the vehicle.

24 Claims, 18 Drawing Sheets

(56) References Cited

U.S. PATENT DOCUMENTS

| | | | |
|---|---|---|---|
| 7,841,110 B2* | 11/2010 | Koch et al. | 37/231 |
| 7,963,052 B2* | 6/2011 | Koch et al. | 37/231 |
| 8,065,822 B2* | 11/2011 | Maas et al. | 37/231 |
| 8,381,422 B2* | 2/2013 | Hill | 37/231 |
| 2004/0172858 A1* | 9/2004 | Bloxdorf et al. | 37/231 |
| 2005/0206126 A1* | 9/2005 | Harris | 280/479.1 |
| 2007/0101620 A1* | 5/2007 | Roy | 37/232 |
| 2008/0222925 A1* | 9/2008 | Belzile et al. | 37/231 |
| 2009/0277048 A1* | 11/2009 | Stephan | 37/231 |
| 2009/0307941 A1* | 12/2009 | Gamble, II | 37/231 |
| 2011/0067274 A1* | 3/2011 | Stevens et al. | 37/231 |
| 2011/0168417 A1* | 7/2011 | Benesch | 172/829 |
| 2011/0277357 A1* | 11/2011 | Schmeichel | 37/231 |
| 2012/0121321 A1* | 5/2012 | Hill | 403/287 |
| 2012/0138881 A1* | 6/2012 | Elliott et al. | 254/272 |

* cited by examiner

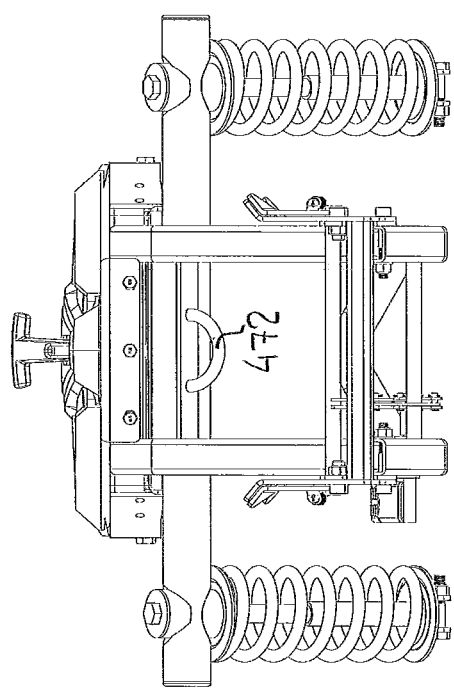

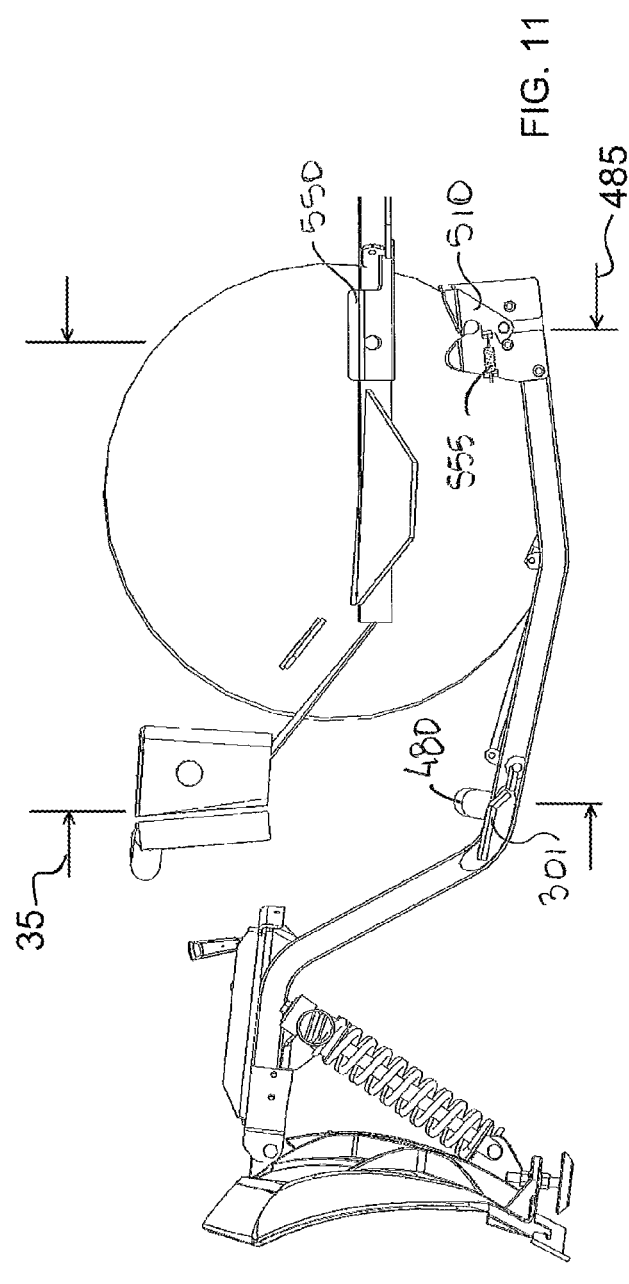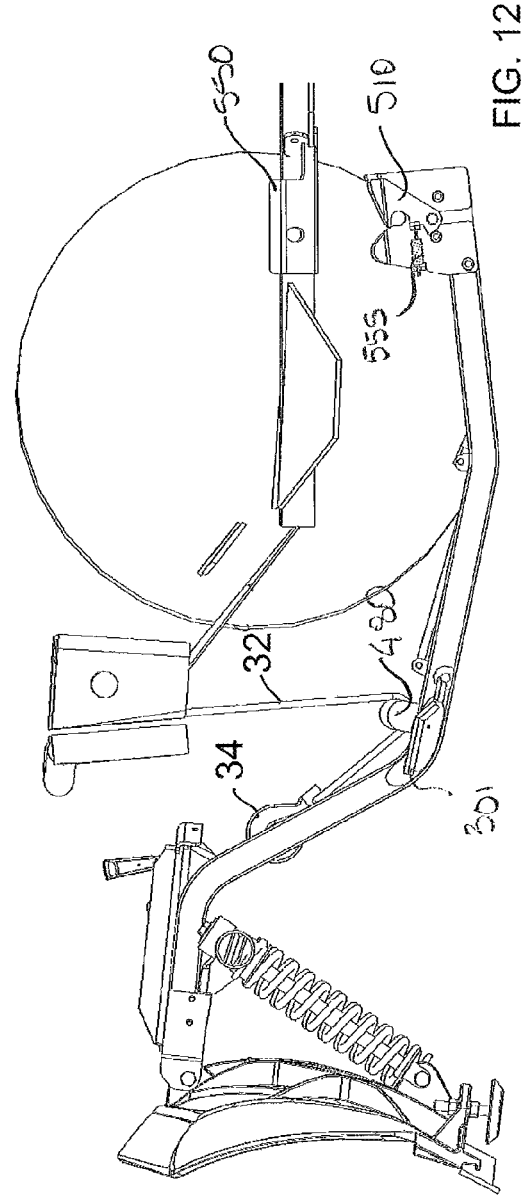

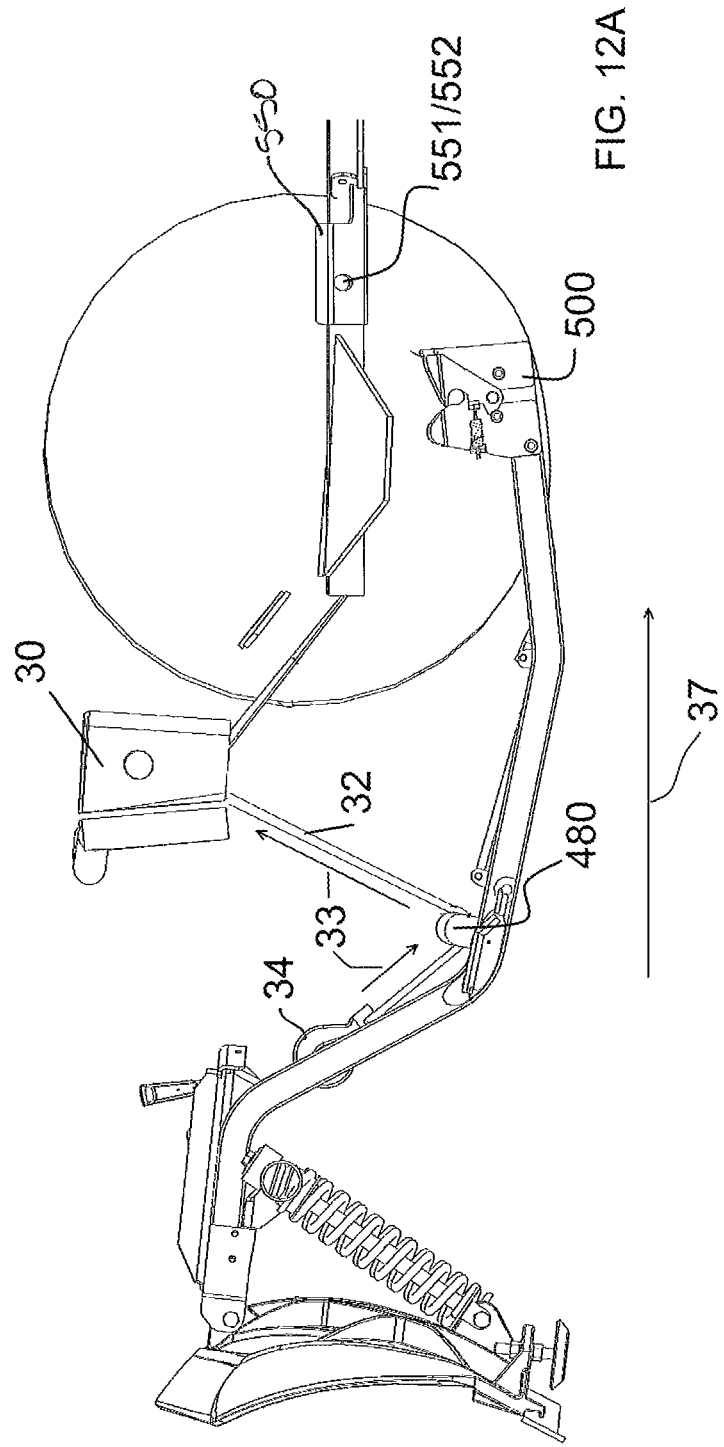

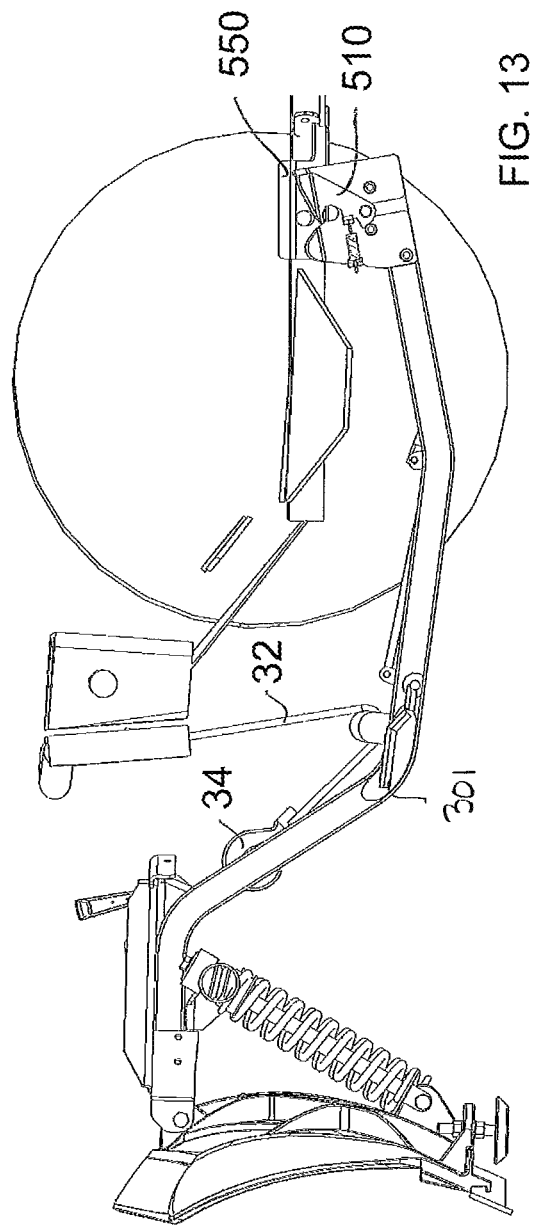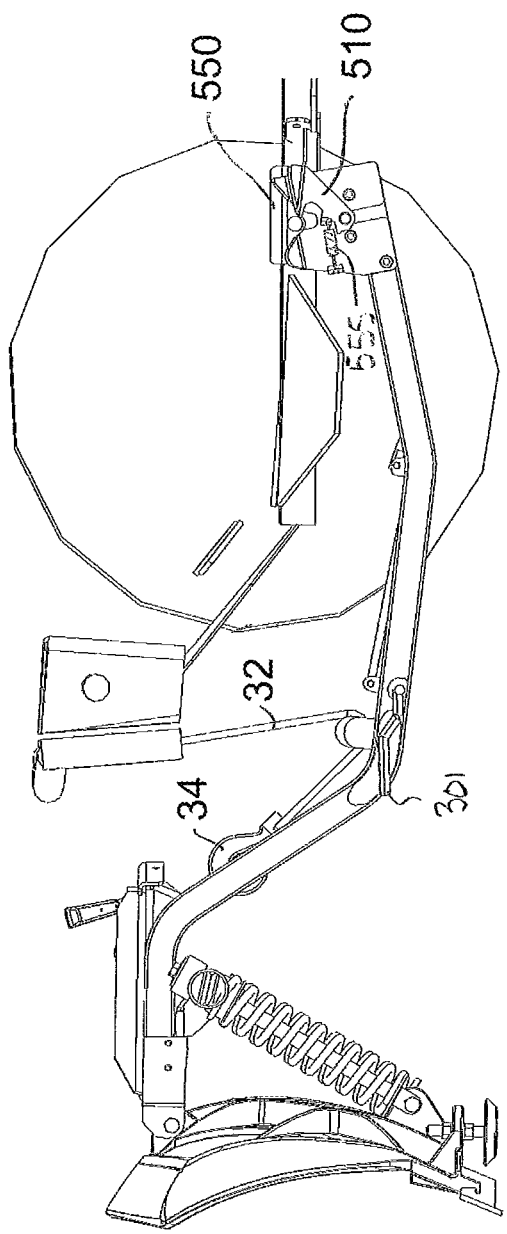

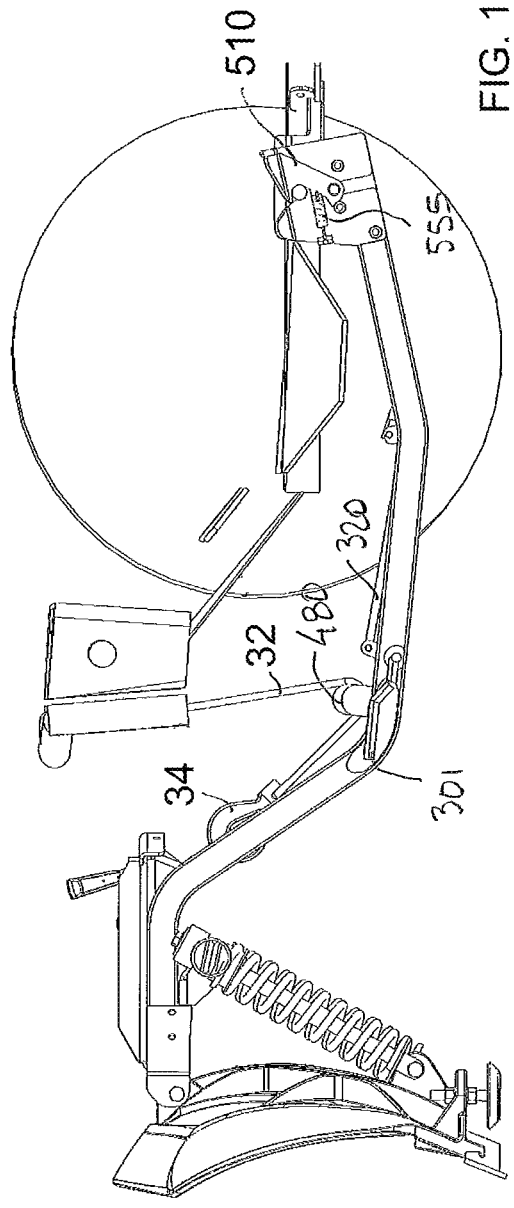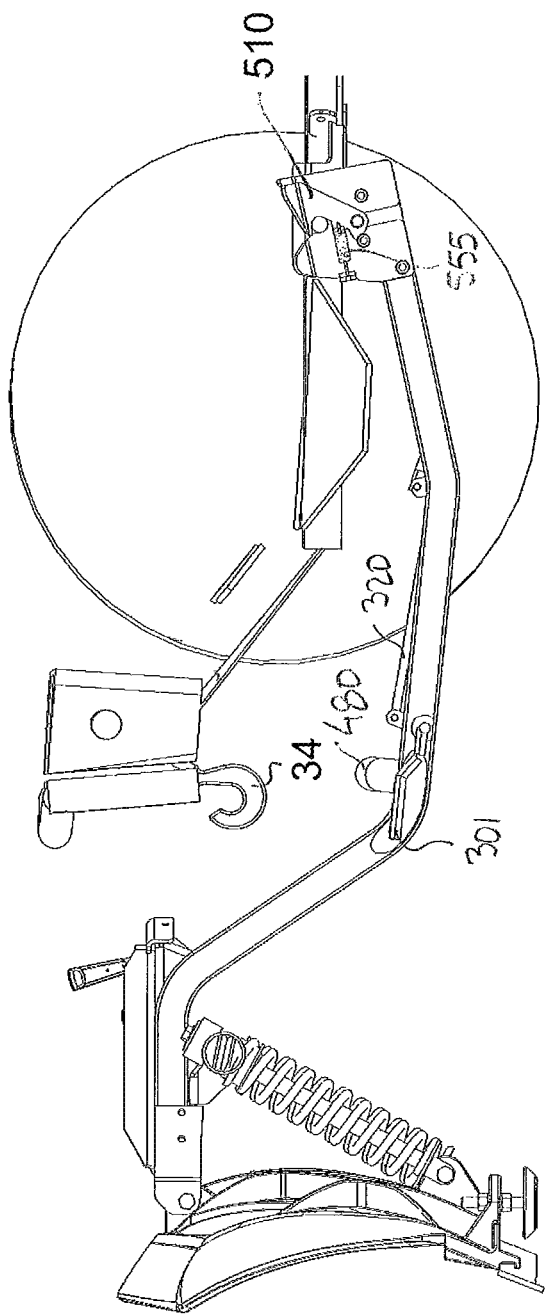

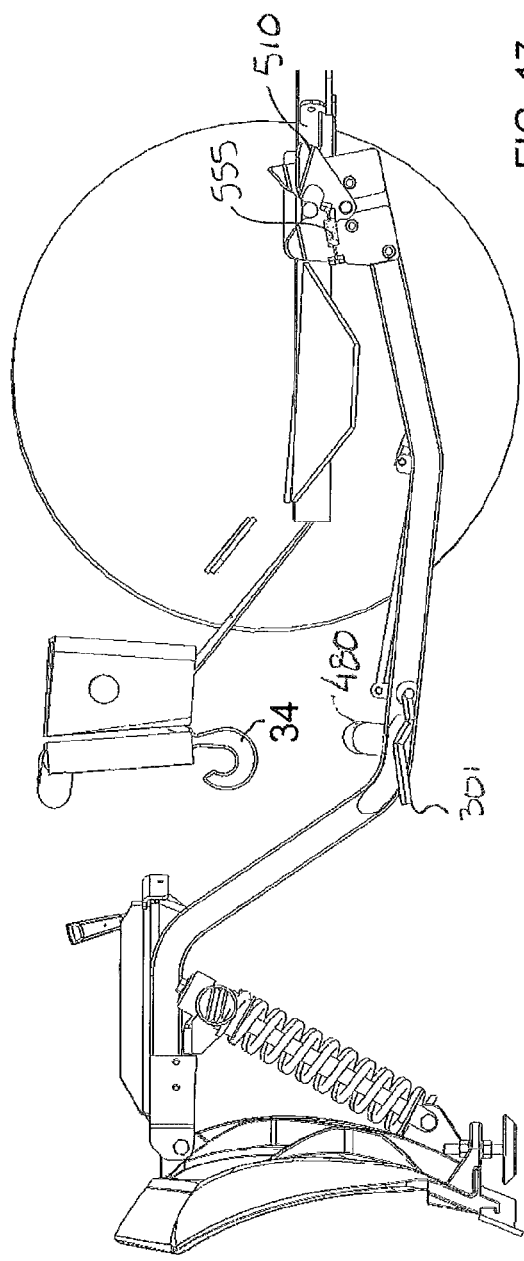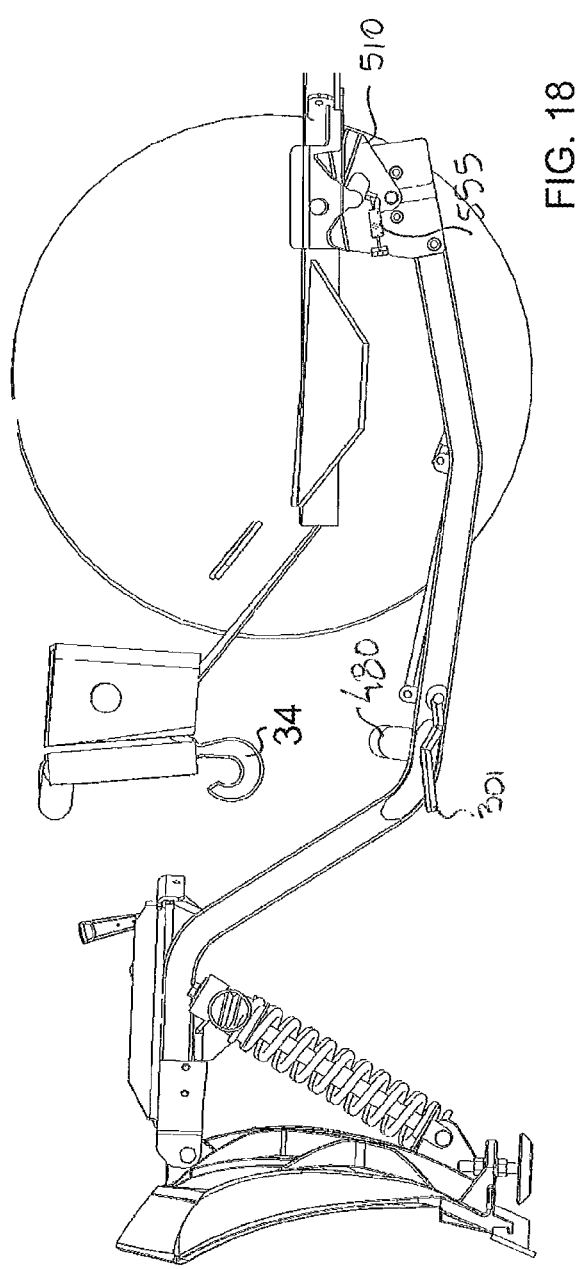

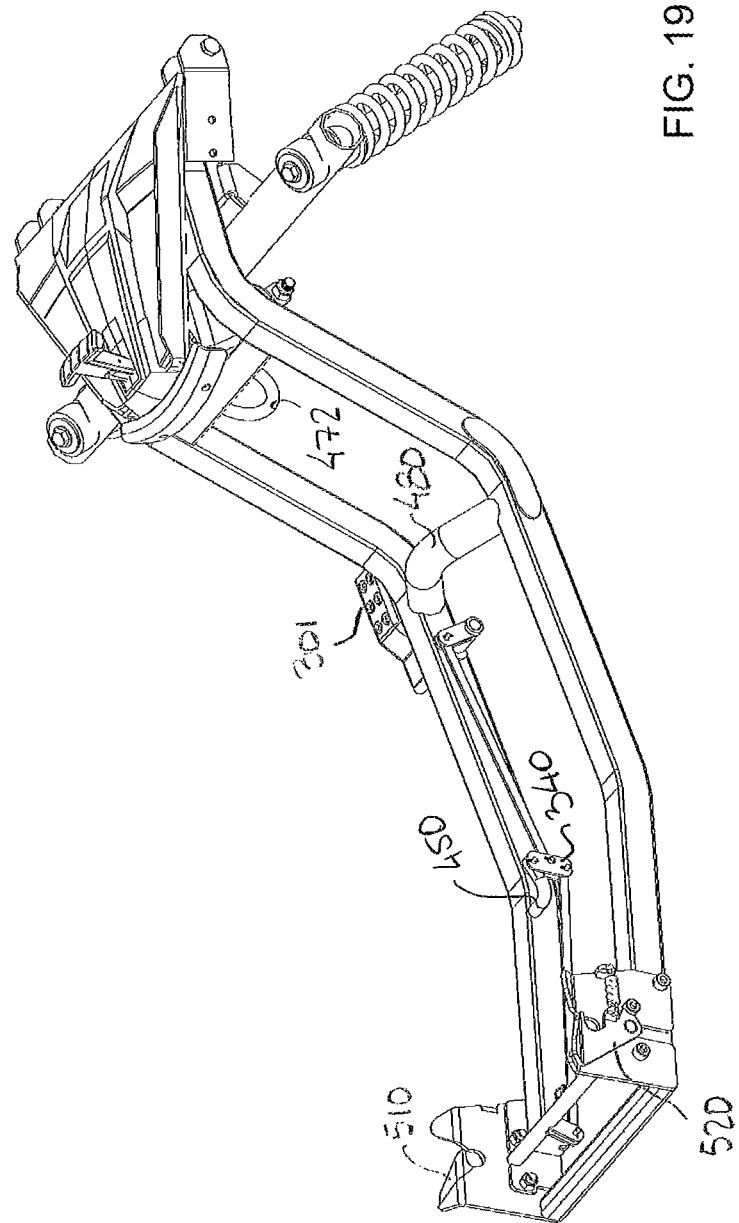

FRAME ASSEMBLY FOR COUPLING AN IMPLEMENT TO A VEHICLE

CROSS-REFERENCE TO RELATED APPLICATIONS

The present patent application claims the benefits of priority of commonly assigned U.S. Provisional Patent Application No. 61/365,077, entitled "Frame Assembly for Coupling an Implement to a Vehicle", filed at the United States Patent and Trademark Office on Jul. 16, 2010, and incorporated herein by reference.

FIELD OF THE INVENTION

The present invention relates to support frame assemblies to support plows, implements, and other accessories on vehicles. More particularly, the present invention relates to support frame assemblies to support plows, implements, and other accessories on small vehicles such as all-terrain vehicles ("ATV" or "ATVs").

BACKGROUND OF THE INVENTION

Since a couple of years, the ATV market has been growing steadily. Moreover, ATV users have been using their vehicles for new tasks such as snow removal, load transport, etc. To help ATV users make the fullest use of their vehicles, numerous accessories have been put on the market. For example, snow plow assemblies, traction kits, carrying cases, trailer hitches, etc.

However, in order for the ATV user to use an accessory to its full capacity, the accessory must be easy to use and more importantly, easy to install. In the field of support frame assemblies for snow plows and other front-mounted implements, this is even more important since these assemblies are generally relatively heavy and thus difficult to manipulate and install.

Support frame assemblies currently on the market are not easy and/or are time consuming to install. In the vast majority of cases, when the user is alone, he or she (hereinafter, for the sake of simplicity, only the masculine form will be used) must use brute force to install the frame assembly on his ATV. This comes from the fact that all the weight of the plow assembly rests on the ground. Thus, the user must overcome the friction force between the ground and the plow. Moreover, since snow plows are generally made of metal, they can be relatively heavy and the friction force between the ground and the plow can be relatively large.

Thus, in general, most frame assemblies currently on the market are more easily installed when two or more individuals are present.

Finally, in current frame assemblies, the pivotal connection between the plow and the frame assembly is usually located near the ground, making it difficult for the plow to follow the irregularities of the ground surface over which the plow is operated. The ATV is also more prone to sudden stops when the plow hits small obstacles. In that sense, when a plow mounted to a current frame assembly hits a small obstacle, the speed of the ATV typically significantly reduced, causing the wheels to spin, sometimes to the point of losing all traction and stopping the vehicle. Plows mounted to current frame assemblies can hardly follow a rough terrain because they operates only in two positions, namely when the plow is straight or flipped.

In view of the foregoing, there is indeed a need for a new and improved support frame assembly for a plow or other implement which mitigates at least some of the shortcoming of prior art support frame assemblies.

SUMMARY OF THE INVENTION

The present invention generally provides a support frame assembly for supporting a plow or another front-mounted implement to a small vehicle such as an all-terrain vehicle ("ATV").

Since the support frame assembly in accordance with the present invention can be used with implements and accessories other than plows, hereinafter, the term "plow" shall be construed broadly and shall therefore relate to any front-mounted accessories such as plow, blade and other similarly mounted implements.

In accordance with the principles of the present invention, the frame assembly provides an easier way to install and remove the frame assembly to and from the vehicle, and/or provides a higher pivotal connection between the plow and the frame assembly, allowing the plow to follow the irregularities of the ground surface more easily.

Hence, in accordance with the principles of the present invention, the frame assembly generally comprises a longitudinally extending frame structure having a front portion, where the plow is mounted, and a rear portion, where a locking mechanism is located.

In accordance with a broad aspect of the present invention, the front portion of the frame assembly is raised with respect to the rear portion of the frame assembly. This raised front portion also comprises one or more pivot points for pivotally connecting the plow to the frame assembly. The higher pivot points, which can be located directly on the frame assembly or on an angular adjustment mechanism, helps the plow to more easily follow the irregularities of the ground surface and also generally prevents the vehicle from stopping when the plow hits small obstacles. In that sense, the higher location of the pivot points generally allows the lower portion of the plow to pivot rearwardly when it contacts a small obstacle, thereby allowing the plow to pass over the obstacle(s) without stopping and allowing the vehicle to keep moving.

The higher location of the pivot points also provides a longer relative distance between the frame assembly and the cutting edge of the plow (e.g. the lower edge which contacts the ground), thereby generally reducing the transmission of shocks to the user and to the vehicle when an impact occurs with a larger and/or more rigid obstacle. The longer relative distance between the frame assembly and the cutting edge also generally allows the vehicle to slow down over a longer distance, giving a smaller deceleration.

Still, to maintain the plow in an operative position, the frame assembly comprises at least one but typically a pair of springs extending between the front portion of the frame assembly, or of the angular adjustment mechanism, and the lower portion of the plow such as to bias the lower portion of the plow in a generally forward direction.

Understandably, the combination of the higher pivot points and of the springs allows the lower portion of the plow to temporarily move rearwardly when the plow contacts a small obstacle. The springs bias the lower portion back to its normal operative position when the obstacle is passed over.

As indicated above, the frame assembly can comprise an angular adjustment mechanism mounted to the front portion thereof. In accordance with the principles of the present invention, by mounting the angular adjustment mechanism to the raised front portion and thus, at a higher location, the angular adjustment mechanism becomes more easily accessible. In that sense, having an adjustment handle at a higher location allows the user to more easily grab the handle and to do so at a more comfortable height.

Also, having the angular adjustment mechanism located at a higher location with respect to prior art support frame assemblies also generally reduces the risks of having the angular adjustment mechanism freezing during winter. Indeed, having the angular adjustment mechanism located at a higher location makes it less prone to snow and ice accumulations.

Though not necessary, a plastic cover can be mounted over the angular adjustment mechanism to further prevent snow and ice accumulations. The plastic cover can also provide a better overall look to the frame assembly.

In accordance with another broad aspect of the present invention, the frame assembly comprises a locking mechanism located on the rear portion of the frame. The locking mechanism allows the frame assembly to lock itself automatically upon installation and allows the frame assembly to be easily unlocked by the user. The locking mechanism also ensures that it will not unlock itself accidentally during use.

The locking mechanism typically allows a single user to install the frame assembly to the vehicle.

The locking mechanism comprises at least one but typically a pair of spring-loaded retaining members.

To connect the frame assembly to the vehicle, the user typically parks the vehicle approximately in the same axis as the frame assembly and attaches the winch hook, or directly the cable if no hook is present, to a hook, or cable, connecting member on the frame assembly, via a winch cable supporting member.

In that sense, the particular position of the winch cable supporting member causes the frame assembly to position itself correctly under the vehicle when the winch is activated.

Then, as the winch continues to pull the frame assembly upwardly, the upward movement of the frame assembly forces open the spring-loaded retaining members which then lock onto one or more rods of the mounting plate (or mounting assembly) located underneath the vehicle.

An unlocking mechanism operatively connected to the locking mechanism and typically activated by a pedal or lever, allows the frame assembly to be easily removed from the vehicle. In that sense, after having lowered the front portion of the frame assembly to the ground with the winch, the user simply depresses the pedal with one foot. The unlocking mechanism then forces open the spring-loaded retaining members, unlocking the locking mechanism from the mountings rods and allowing the rear portion of the frame assembly to fall on the ground.

The support frame assembly in accordance with the principles of the present invention typically allows a more gradual movement of the plow when that latter encounters irregularities on the ground surface. The gradual movement is made possible because the pivot point which connects the plow to the frame assembly is located at a higher location with respect to prior art frame assemblies.

The support frame assembly in accordance with the principles of the present invention also generally simplifies the installation and removal of the support frame assembly to and from a vehicle.

In that sense, the support frame assembly in accordance with the principles of the present invention typically allows a single user to install and remove the support frame assembly to and from a vehicle, and generally with very little effort.

Other and further descriptions and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 10 is a rear view of the frame assembly of FIG. 1.

FIGS. 11 to 18 are side views showing the installation process and the removal process.

FIG. 19 is a perspective view of another embodiment of a frame assembly in accordance with the principles of the present invention.

DETAILED DESCRIPTION OF THE PREFERRED EMBODIMENT

A novel frame assembly for coupling an implement to a vehicle will be described hereinafter. Although the invention is described in terms of specific illustrative embodiments, it is to be understood that the embodiments described herein are by way of example only and that the scope of the invention is not intended to be limited thereby.

Figure 1:
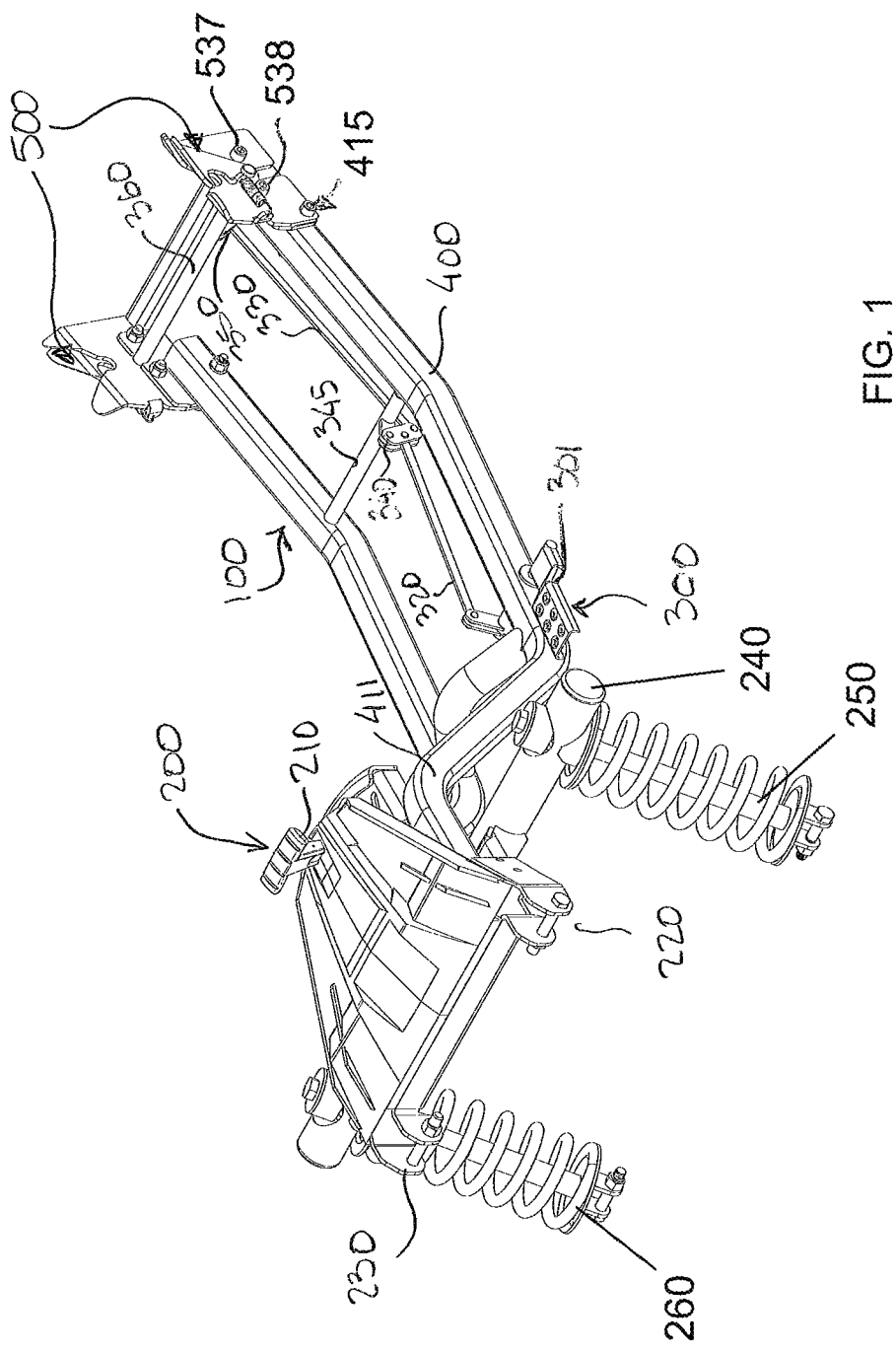
FIG. 1 is perspective view of an embodiment of a frame assembly in accordance with the principles of the present invention.

Referring to FIG. 1, a frame assembly 100 in accordance with the principles of the present invention is shown. The frame assembly 100 generally comprises an angular adjustment mechanism 200, a releasing or unlocking mechanism 300, a longitudinally extending frame 400, and a locking mechanism 500. The assembly and the mechanisms are detailed hereunder.

Frame Assembly

Figure 2:
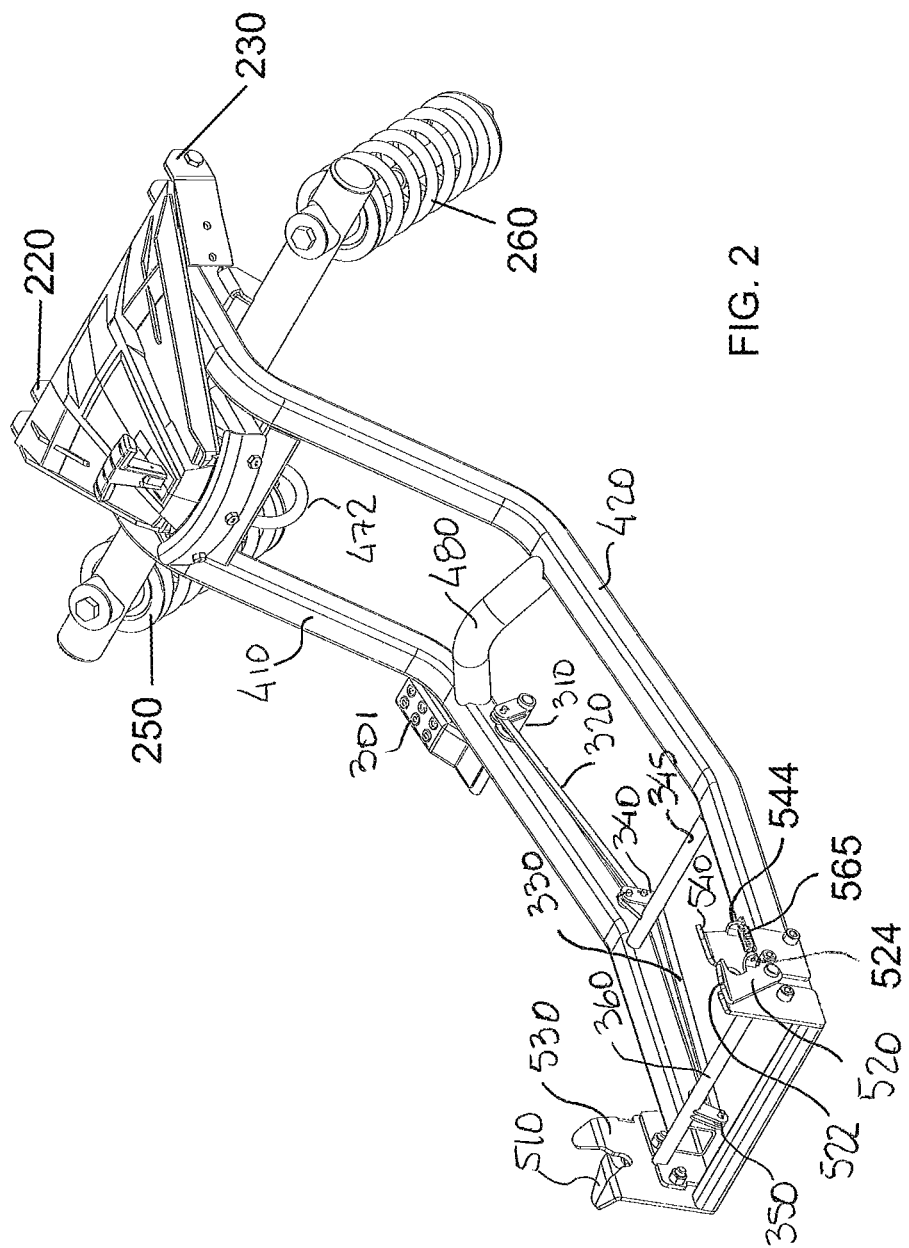
FIG. 2 is another perspective view of the frame assembly of FIG. 1.

As seen generally in the figures and more particularly in FIGS. 1 and 2, the frame assembly 100 comprises the frame 400. The frame 400 generally extends longitudinally and comprises a front or forward end portion 411 and a rear or rearward end portion 415. In the present embodiment, the frame 400 is substantially H-shaped and comprises two longitudinal members 410 and 420.

Figure 9:
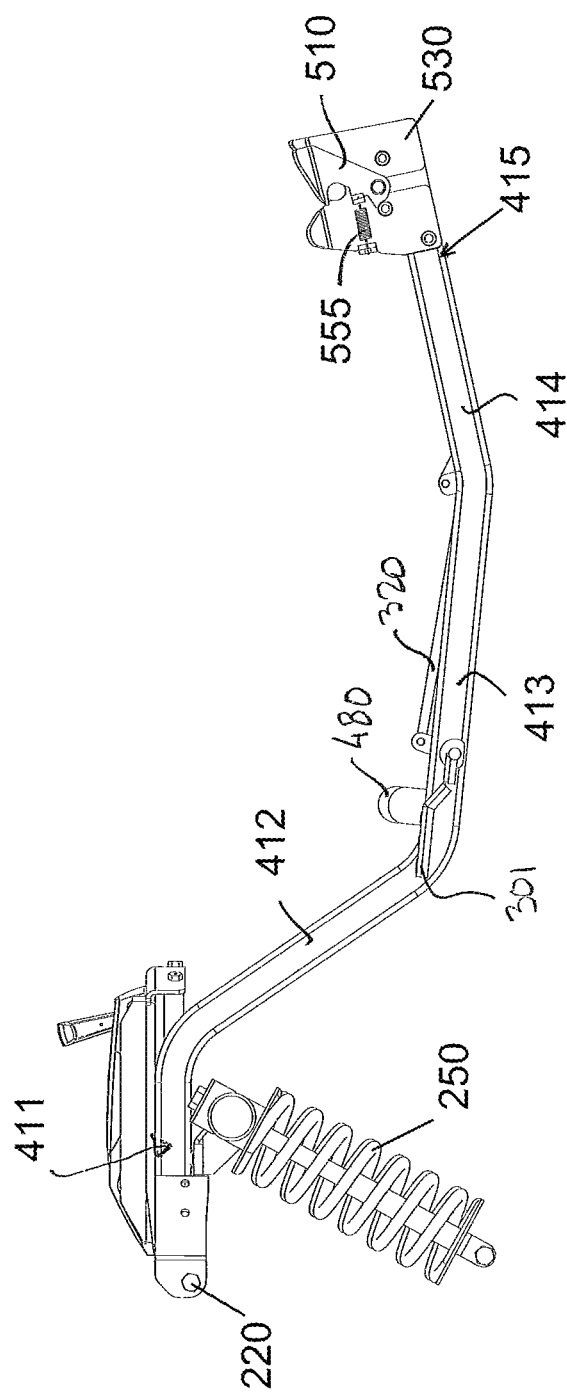
FIG. 9 is a left side view of the frame assembly of FIG. 1.

Referring to FIGS. 1 and 2 and particularly to FIG. 9, the forward end portion 411 of the frame 400, and of the members 410 and 420, is more elevated then the rearward end portion 415.

Because of the symmetric nature of the members 410 and 420, only member 410 will be described. At about a third of way, starting from the forward end portion 411, the member 410 is bent downwardly at 412, generally towards the ground. Then, at about three fifths of the way, starting from the forward end portion 411, the member 410 is slightly bent at 413 at a less pronounced angle. At about a fifth of the way starting from the rearward end portion 415, the member 410 is then bent slightly upwardly at 414 in order for the locking mechanism 500 to reach the mounting rods 551 and 552 of the mounting plate 550 connected to the vehicle 10 (see FIG. 3).

Referring back to FIGS. 1 and 2, the frame 400 also comprises a winch cable supporting member 480 connected to and extending between the members 410 and 420. In the present embodiment, the winch cable supporting member 480 has a generally inverted 'U' shape. The frame 400 also typically comprises a winch hook connecting member 472 to which the winch hook 34 is to be connected.

As it will be best understood below, the position of the winch cable supporting member 480 along the length of the frame 400 is typically chosen by taking into account the center of gravity of the frame assembly 100 (when equipped with a plow 20), the position of the winch 30 on the vehicle 10, and the position of the mounting plate 550 underneath vehicle 10. In that sense, though not shown, the position of the winch cable supporting member 480 could be adjustable in order to accommodate different configurations of winch position and mounting plate position.

Figure 3:
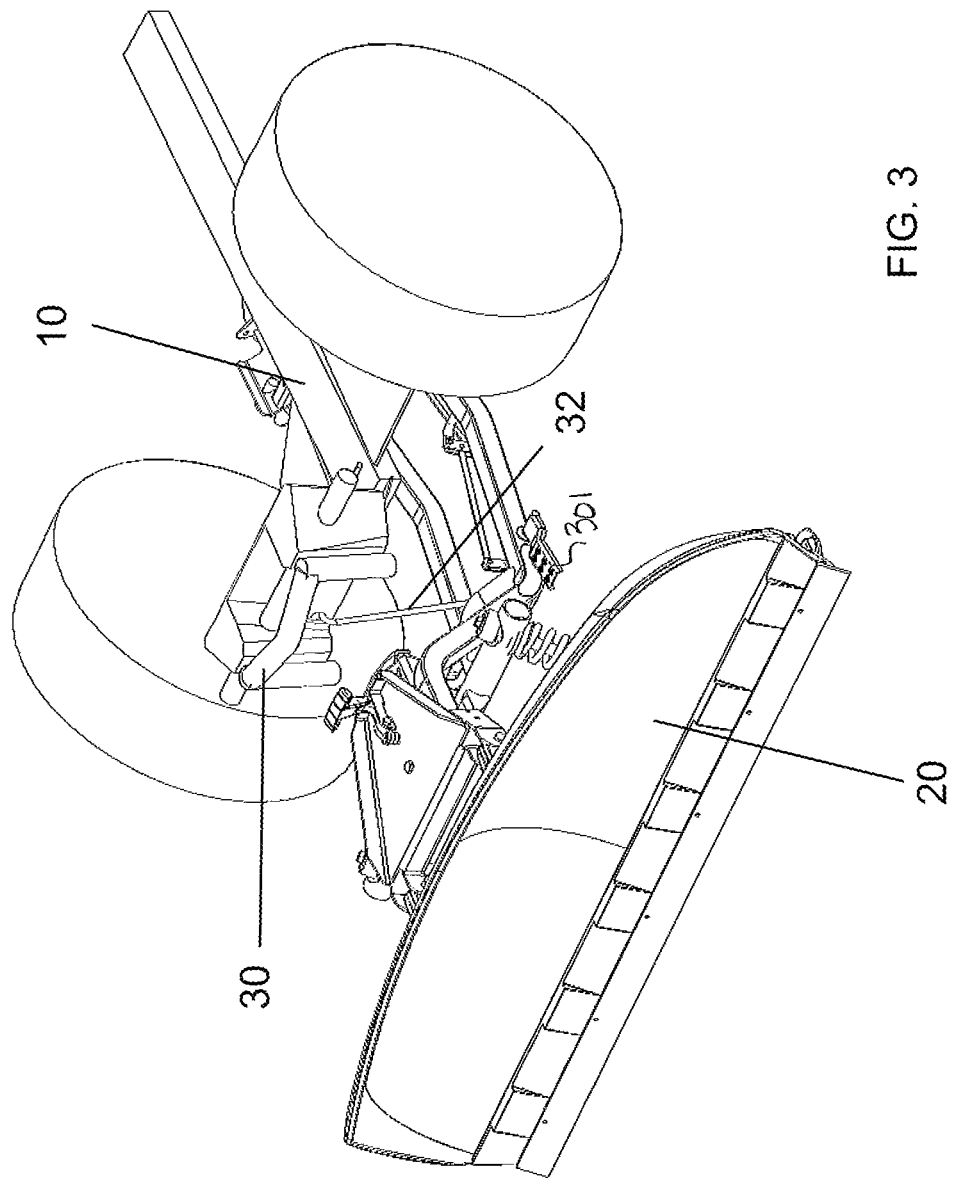
FIG. 3 is a perspective view of the frame assembly of FIG. 1, equipped with a plow and attached to a schematic partially shown ATV.

As it will also be best understood below, having the forward end portion 411 of the frame 400 located at a higher elevation with respect to the rearward end portion 415 provides significant benefits such as having an easier access to the angular adjustment mechanism 200 and having a higher pivot point for the plow 20 (see FIG. 3).

Angular Adjustment Mechanism

The general configuration of angular adjustment mechanisms is generally known in the art and only certain aspects will be detailed herein.

In the present embodiment, the angular adjustment mechanism 200 is the link between the plow 20 (or any other implement) and the frame 400, and allows the adjustment of the angle of the plow 20 with respect to a longitudinal axis of the frame 400.

In accordance with the principles of the present invention, the angular adjustment mechanism 200 is mounted to the forward end portion 411 of the frame 400 such that the angular adjustment mechanism 200 is also located at a higher elevation.

Since the angular adjustment mechanism 200 is located higher, the angular adjustment mechanism 200 is more accessible to the user. Indeed, the handle 210, which allows the angle of the plow 20 to be changed, is more accessible.

Also, by having the angular adjustment mechanism 200 located at a higher location, the angular adjustment mechanism 200 becomes less prone to freezing during winter.

Figure 7:
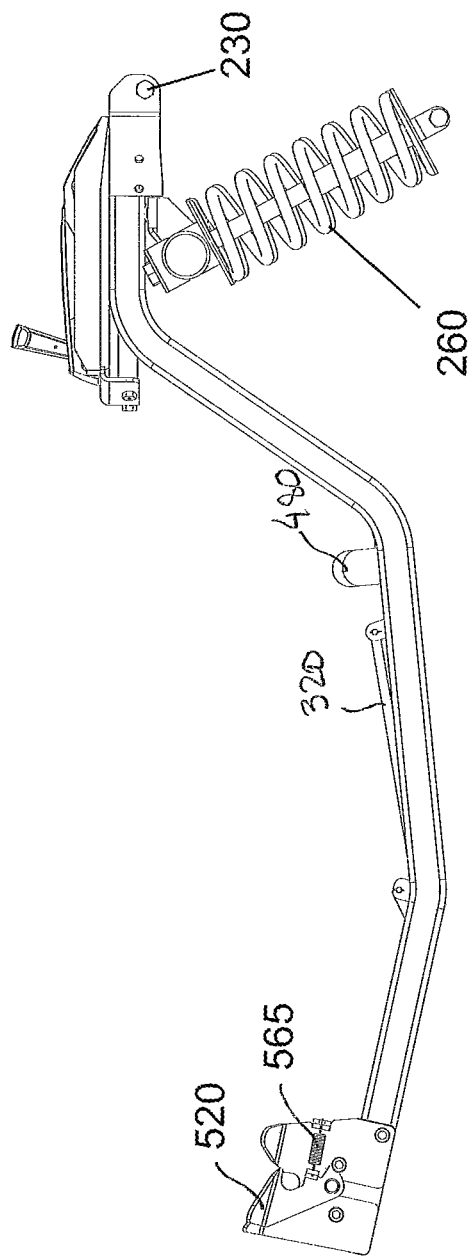
FIG. 7 is a right side view of the frame assembly of FIG. 1.

Referring now to FIGS. 1, 7 and 9, the elevated position of the angular adjustment mechanism 200 provides for the higher elevation of the pivot points 220 and 230. Pivot points 220 and 230 are the points where the plow 20 is directly pivotally connected to the angular adjustment mechanism 200.

The angular adjustment mechanism 200 also comprises a laterally extending support member 240 which supports a pair of springs 250 and 260. The springs 250 and 260 extend between the support member 240 and the lower portion of the plow 20 (see FIG. 3). The springs 250 and 260 bias the lower portion of the plow 20 forwardly (i.e. in an operative position) but still allows the lower portion of the plow 20 to pivot rearwardly with respect to pivot points 220 and 230.

Indeed, the combination of the higher pivot points 220 and 230 and of the springs 250 and 260 allows the plow 20 to pivot rearwardly when the lower portion of the plow 20 contacts small obstacles, thereby allowing the plow 20 to pass over small obstacles.

Understandably, in other embodiments, the angular adjustment mechanism 200 could be omitted. In those embodiments, the pivot points 220 and 230 would be located directly on the front end portion 411 of the frame 400, and the support member 240 would be mounted to, or extend from, the front end portion 411 of the frame 400. The springs 250 and 260 would still extend between the support member 240 and the lower portion of the plow 20.

Locking Mechanism

Figure 4:
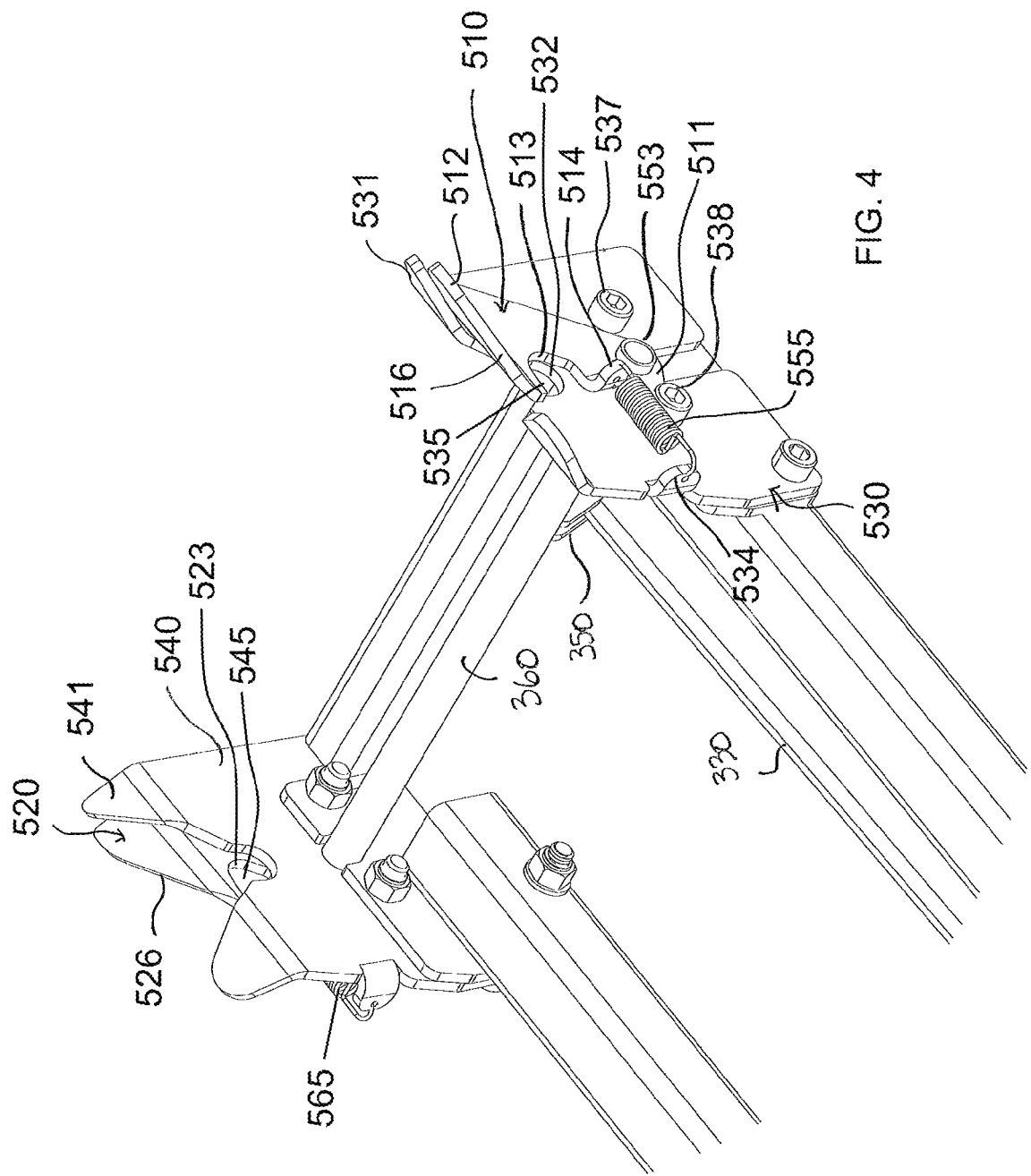
FIG. 4 is a close-up view of the locking mechanism of the frame assembly of FIG. 1.
Figure 5:
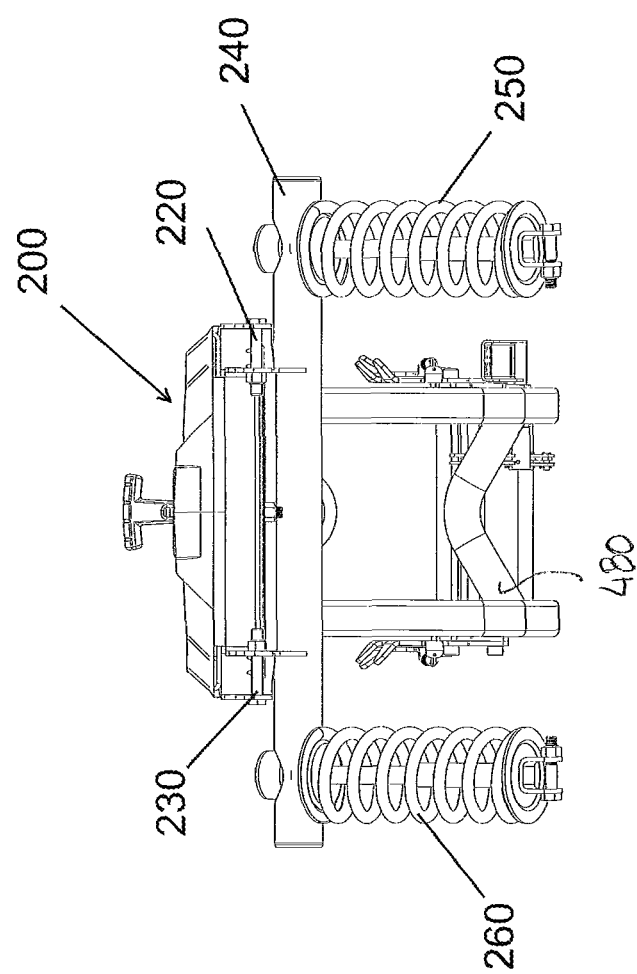
FIG. 5 is a front view of the frame assembly of FIG. 1.

As seen generally in the figures and more particularly in FIG. 4, the rearward end portion 415 of the frame 400 comprises a locking mechanism 500 configured to releasably engage a mounting plate 550 (see FIG. 22) secured to the underside of the vehicle 10.

In the present embodiment, the locking mechanism 500 comprises a pair of side plates 530 and 540 to which are respectively mounted spring-loaded retaining members 510 and 520.

Figure 22:
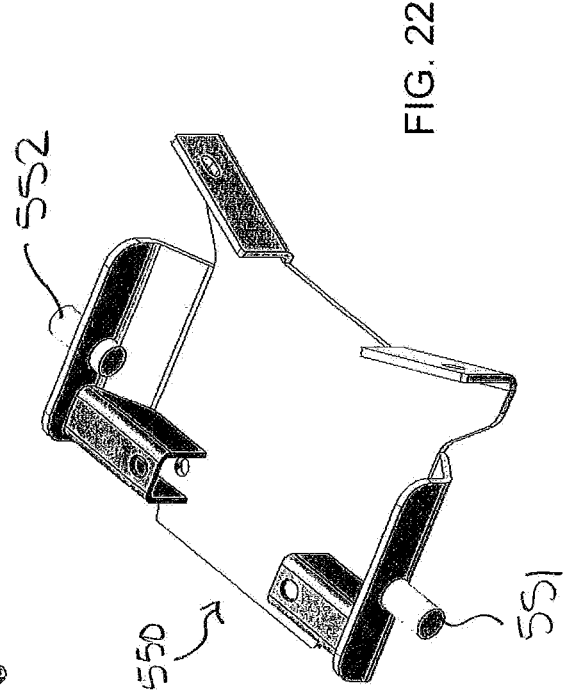
FIG. 22 is a perspective view of an exemplary mounting plate.

The main use of the retaining members 510 and 520, in cooperation with the plates 530 and 540, is to securely attach the frame 400 of the frame assembly 100 to the mounting plate 550 connected to the vehicle, and more particularly to the mounting rods 551 and 552 (see FIG. 22).

The retaining members 510 and 520 are two symmetric pieces of equipment. Because of their symmetric nature, only retaining member 510 will be described.

Referring to FIGS. 4 and 9, retaining member 510 is broadly configured as a hook and comprises a round bottom portion 511 and a pointed top portion 512. The top portion 512 of the retaining member 510 is also curved or bent outwardly from the frame 400, allowing it to slide horizontally along a similarly curved top portion 531 of the side plate 530. The top portion 512 of the retaining member 510 has a slope 516 (also seen on the other retaining member 520 as 526). At the end of the slope 516 of the pointed portion 512 is a curved recess 513 which has a radius generally matching the radius of the mounting rods 551 and 552 of the mounting plate 550.

As best shown in FIGS. 4 and 9, the recess 513 cooperates with the similarly curved bottom 532 of the side plate 530 to form a generally circular opening 535 when the retaining member 510 is in locked position. Understandably, the opening 535 is properly sized to receive one of the mounting rods 551 and 552.

The retaining member 510 and the plate 530 respectively comprise extensions or ears 514 and 534, bent outwardly, between which extends a spring 555. The spring 555 is generally configured to maintain the retaining member 510 in a locked position.

The retaining member 510 is pivotally connected to the side plate 530 at 553 via the second rotating member 360 of the quick-release mechanism 300 which extends through the side plate 530 (and also through side plate 540).

In the present embodiment, the retaining member 510 and 520 are interdependent with the second rotating member 360 of the quick-release mechanism 300 such that rotation of the second rotating member 360 causes pivotal movement of both retaining member 510 and 520 and such that the pivotal movement of one of the retaining member 510 and 520 causes the pivotal movement of the other of the retaining member 510 and 520.

To prevent excessive rotation of the retaining member 510, stoppers 537 and 538 are provided on the side plate 530.

Due to the symmetric nature of the side plates 530 and 540 and of the retaining members 510 and 520, and as shown in FIG. 7, the arrangement of the retaining member 520 with the side plate 540 and the spring 565 is essentially identical to the arrangement of the retaining member 510 with the side plate 530 and the spring 555.

In accordance with the principles of the present invention, the locking mechanism 500 works in cooperation with the winch hook connecting member 472 and more particularly with the winch cable supporting member 480 to automatically lock itself to the vehicle 10 upon activation of the winch 30.

To do so, the winch cable supporting member 480, under which the winch cable 32 passes (see FIGS. 12 and 12A), needs to be located along the length of the frame 400 such than when the locking mechanism 500 is substantially vertically aligned with the mounting rods 551 and 552 of the mounting plate 550, the winch cable supporting member 480 is substantially vertically aligned with the winch 30. Hence, as best illustrated in FIG. 11, the longitudinal distance 485 between the winch cable supporting member 480 and the locking mechanism 500 should be substantially equal to the longitudinal distance 35 between the winch 30 and the mounting rods 551 and 552. Understandably, the position of the winch cable supporting member 480 could be adjustable (or adjusted) to obtain the proper longitudinal distance 485.

In the present embodiment, as shown in FIG. 2, the winch hook connecting member 472 is located longitudinally between the plow 20 and the winch cable supporting member 480. Still, in the resent embodiment, the longitudinal distance between the winch cable supporting member 480 and the winch hook connecting member 472 is generally fixed during operation of the winch 30 (see also FIGS. 12 to 15).

It is to be understood that when a plow 20 is mounted to the frame assembly 100, the center of gravity of the plow 20/frame assembly 100 is generally located between the plow 20 and the winch cable supporting member 480.

Hence, as the winch 30 pulls on the frame assembly 100, the winch 30 will drag the plow 20/frame assembly 100 toward the vehicle 10 until the winch cable supporting member 480 is substantially vertically aligned with the winch 30 and the locking mechanism 500 is substantially vertically aligned with the mounting rods 551 and 552. At this point, the portion of the winch cable 32 between the winch 30 and the winch cable supporting member 480 should be substantially vertical.

Then, as the winch 30 further pulls, the rear portion of the frame assembly 100 will rise, causing the retaining members 510 and 520 to be urged against the mounting rods 551 and 552, and forcing the retaining members 510 and 520 to pivot open until the mounting rods are fully received into the openings 535 and 545.

Releasing Mechanism

Figure 6:
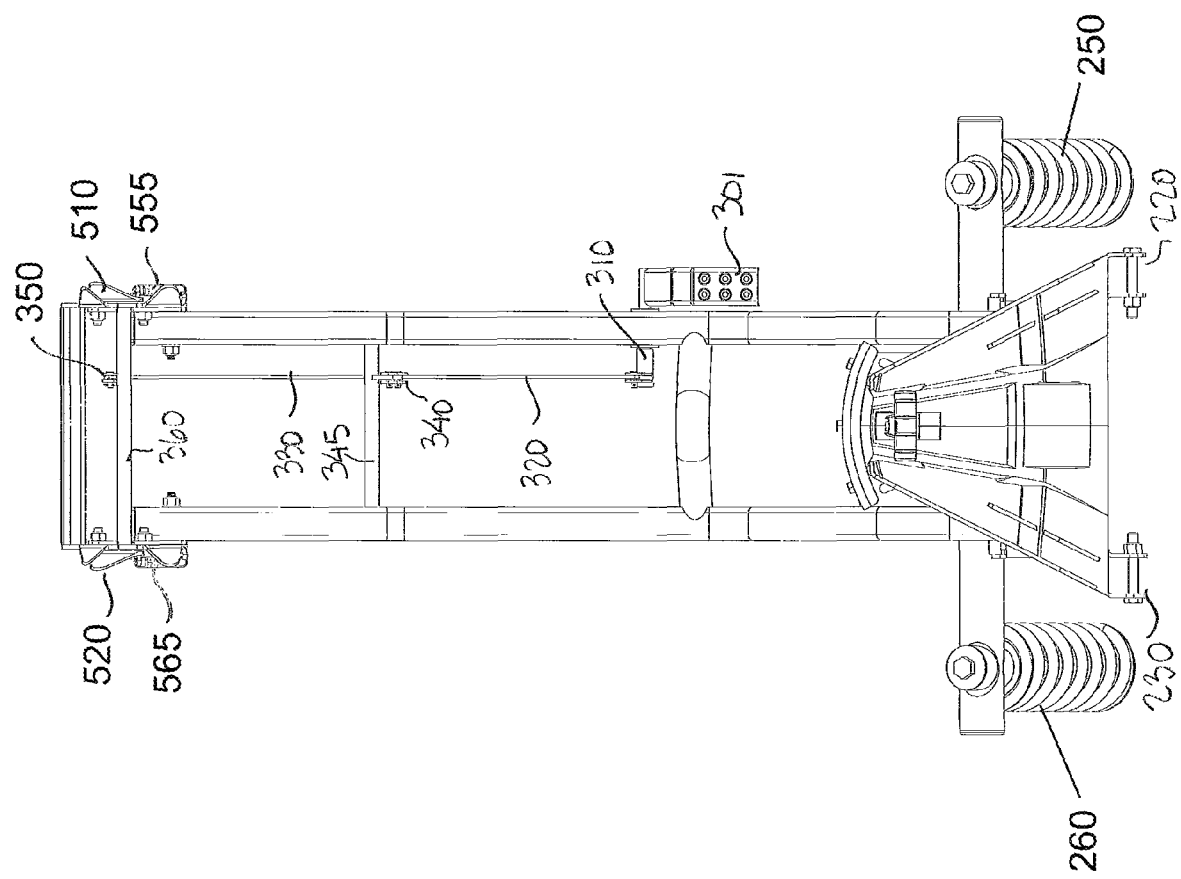
FIG. 6 is a top view of the frame assembly of FIG. 1.
Figure 8:
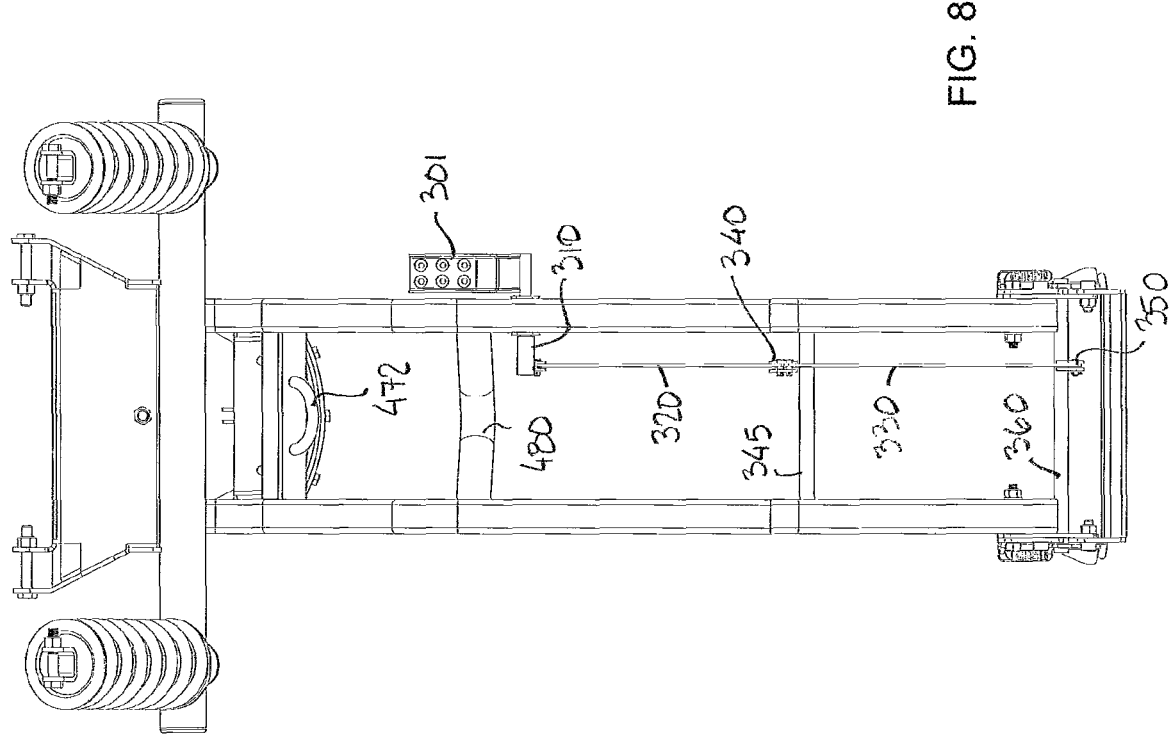
FIG. 8 is bottom view of the frame assembly of FIG. 1.

Referring now to FIGS. 1, 6 and 8, in the present embodiment, the frame assembly 100 comprises a releasing mechanism 300 of the quick-release type.

The quick-release mechanism 300 generally comprises a lever such as a pedal 301 which can be depressed by the user. In that sense, the pedal 301 is typically located more toward the front end portion 411 of the frame 400 such as to be easily accessible by the user.

The pedal 301 is connected to a first rotating member 310 which is pivotally supported by the frame 400. The first rotating member 310 is further pivotally connected to a first arm or linkage 320, which is further pivotally connected to a second arm or linkage 340. The second linkage 340 is also pivotally supported by a laterally extending supporting member 345 as shown in FIG. 1.

The second linkage 340 is further pivotally connected to a third arm or linkage 330 which is finally pivotally connected to the second rotating member 360 via an extension 350 radially extending therefrom.

As can be shown in FIG. 1, though the second linkage 340 is pivotally connected to the first linkage 320, to the supporting member 345, and to the third linkage 330, in the present embodiment, the three pivot points on the second linkage 340 are all distinct.

Once the pedal 301 is depressed by the user, the quick-release mechanism 300 causes the rotation of the second rotating member 360 via the articulated linkages 320, 330 and 340. As the second rotating member 360 rotates, it causes to the retaining members 510 and 520 to pivot open, thereby allowing the mounting rods 551 and 552 to exit the locking mechanism 500. Once the mounting rods 551 and 552 are no longer retained by the retaining members 510 and 520, the frame assembly 100 becomes disconnected from the mounting plate 550 and the frame assembly 100 is free to fall on the ground by its own weight.

Hence, by simply depressing the pedal 301 with his foot, the user can easily disconnect the frame assembly 100 from the mounting plate 550.

General Functioning

The frame assembly 100 is connected to the mounting plate 550 by means of an automatic locking mechanism 500 activated by the vehicle winch 30. In that sense, the frame assembly 100 does not typically need to be manually hooked to the mounting plate 550 of the vehicle and does not typically need more than one person to install the frame assembly 100 to the vehicle 10.

In use, the user parks his vehicle 10 approximately in the same axis as the frame assembly 100, as seen in FIGS. 11 and 12. Then he passes the cable 32 under the winch cable supporting member 480 and attaches the winch hook 34 to the winch hook connecting portion 472.

As seen in FIGS. 13 to 15, the user then activates the winch 30 to pull and raise the frame assembly 100 in its mounted position. Upon contact with the mounting rods 551 and 552, the retaining members 510 and 520 pivot open and until the mounting rods 551 and 552 are fully received into the recesses 513 and 523, at which point the springs 555 and 565 pull back the retaining members 510 and 520 in their locked position. The frame assembly 100 is now ready to be used.

If, as shown in FIG. 12A, during the installation, the vehicle 10 is not properly positioned over the frame assembly 100 such that the winch 30 is substantially vertically aligned with winch cable supporting member 480, then, the winch 30, in cooperation with the winch cable supporting member 480, will cause the frame assembly 100 automatically correctly positioned itself.

Indeed, due to the position of the winch cable supporting member 480, the pulling motion (see arrows 33) of the cable 32 will cause the frame assembly 100 to be dragged toward the vehicle 10 (see arrow 37) until the winch cable supporting member 480 is substantially aligned with the winch 30 and the locking mechanism 500 is substantially aligned with the mounting rods 551 and 552 of the mounting plate 550, as in FIG. 12.

Understandably, though FIG. 12A illustrates a situation wherein the vehicle 10 is rearwardly misaligned with the frame assembly 100 (i.e. the vehicle 10 is behind the proper position), the automatic alignment of the frame assembly 100 would also work if the vehicle 10 was forwardly misaligned with the frame assembly 100 (i.e. the vehicle 10 is in front of the proper position).

Typically, if the frame assembly 100 is positioned reasonably in the same plane as the vehicle 10 (e.g. plus or minus 10 degrees, plus or minus 3 inches sideways), the winch 30 will position and lock the frame assembly 100 in place with without further assistance.

When the frame assembly 100 must be removed, the user first unwinds the winch cable 32 such as to lower the frame assembly 100 as much as possible and then detaches the cable 32 from the frame assembly 100. Then, the user depresses the pedal 301 that will force open the retaining members 510 and 520. No longer connected to the mounting rods 551 ad 552, the frame assembly 100 will fall on the ground by its own weight, as shown in FIGS. 16 to 18.

Hence, a single user can easily install and remove the frame assembly 100 on his vehicle 10 (e.g. ATV) alone, without additional human assistance.

Figure 20:
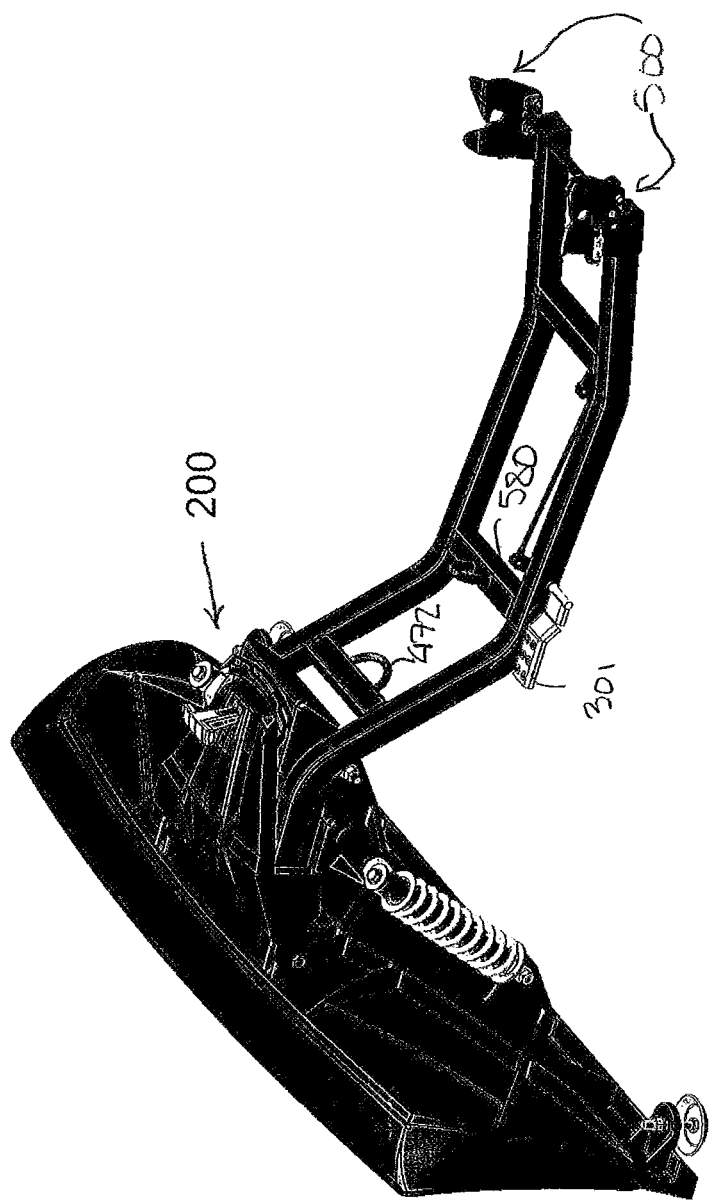
FIG. 20 is a perspective view of yet another embodiment of the frame assembly in accordance with the principles of the present invention.
Figure 21:
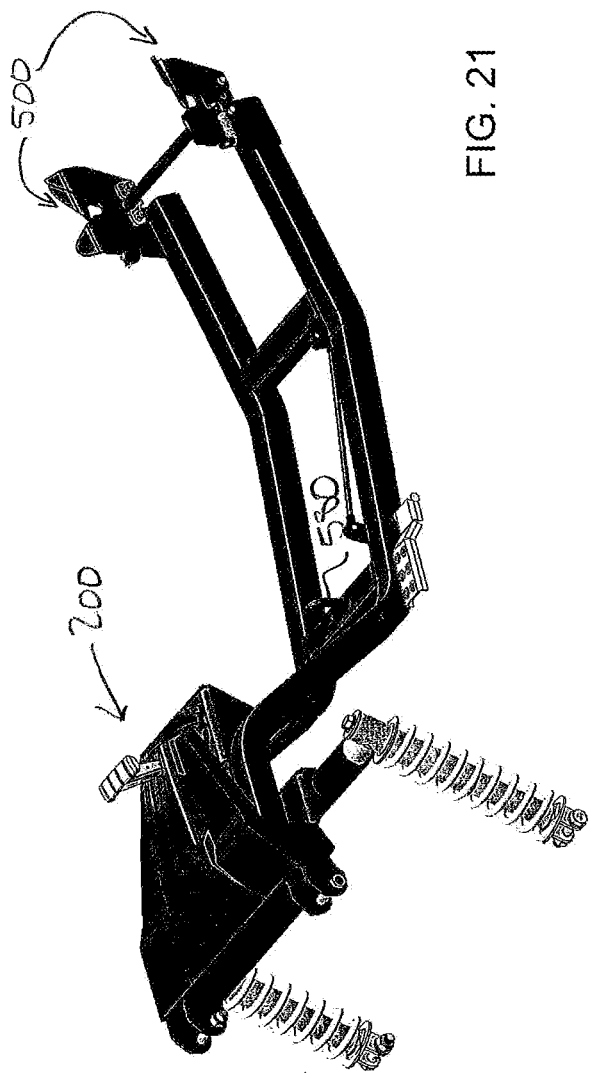
FIG. 21 is a perspective view of the embodiment shown in FIG. 20.

FIGS. 19 to 21 show different embodiment for the frame assembly 100. In the embodiment shown in FIG. 19, the supporting member 345 (see FIG. 1) is replaced by a small supporting rod 450 connected to the frame assembly 100. In the embodiment of FIGS. 20 and 21, the winch cable supporting member 580 comprises a loop through which the winch cable 32 is inserted.

It is to be understood that though the present embodiment incorporates both the more elevated front portion 411 and the combination of the winch cable support member 480 and the locking mechanism 500, the more elevated front portion 411 could be used with a different locking mechanism and the combination of the winch cable support member 480 and the locking mechanism 500 could be used with a frame assembly wherein the front portion is not more elevated then the rear portion.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A frame assembly for supporting an implement on a vehicle, the vehicle comprising a winch and a mounting assembly located underneath the vehicle, the winch and the mounting assembly defining a first longitudinal distance, the frame assembly comprising:
   a) a longitudinally extending frame having a front portion and a rear portion, the frame comprising a winch cable supporting member and a winch cable connecting member, the winch cable supporting member and the winch cable connecting member being longitudinally spaced apart by a second longitudinal distance which is fixed during operation of the winch;
   b) a locking mechanism mounted at the rear portion and configured to releasably engage the mounting assembly of the vehicle, the locking mechanism comprising first and second side plates connected to the rear portion of the frame, and first and second spring-loaded retaining members respectively pivotally mounted to the first and second side plates, the first and second retaining members being displaceable between a locked position and an unlocked position, the locking mechanism and the winch cable supporting member defining a third longitudinal distance which is substantially equal to the first longitudinal distance;
   c) a releasing mechanism mounted to the frame and operatively connected to the locking mechanism such as to displace the first and second retaining members from the locked position to the unlocked position.

2. A frame assembly as claimed in claim 1, wherein the front portion of the frame is located at a higher elevation than the rear portion.

3. A frame assembly as claimed in claim 1, wherein the frame assembly comprises an angular adjustment mechanism mounted at the front portion of the frame, the angular adjustment mechanism being configured to support the implement.

4. A frame assembly as claimed in claim 1, wherein the first and second retaining members are interdependent.

5. A frame assembly as claimed in claim 1, wherein the locking mechanism engages the mounting assembly of the vehicle when the frame assembly is moved upwardly.

6. A frame assembly as claimed in claim 1, wherein the releasing mechanism is connected to the first and second retaining members via articulated linkages.

7. A frame assembly as claimed in claim 1, wherein the releasing mechanism comprises a lever, the lever being operatively interconnected to the first and second retaining members such that rotation of the lever causes the displacement of the first and second retaining members from the locked position to the unlocked position.

8. A frame assembly as claimed in claim 7, wherein the lever is a pedal.

9. A frame assembly, in combination with an implement, for supporting the implement on a vehicle, the vehicle comprising a winch and a mounting assembly located underneath the vehicle, the winch and the mounting assembly defining a first longitudinal distance, the frame assembly comprising:
   a) a longitudinally extending frame having a front portion and a rear portion, the frame comprising a winch cable supporting member and a winch cable connecting member, the winch cable supporting member and the winch cable connecting member being longitudinally spaced apart by a second longitudinal distance which is fixed during operation of the winch;
   b) a locking mechanism mounted at the rear portion and configured to releasably engage the mounting assembly of the vehicle, the locking mechanism comprising first and second side plates connected to the rear portion of the frame, and first and second spring-loaded retaining members respectively pivotally mounted to the first and second side plates, the first and second retaining members being displaceable between a locked position and an unlocked position, the locking mechanism and the winch cable supporting member defining a third longitudinal distance which is substantially equal to the first longitudinal distance;
   c) a releasing mechanism mounted to the frame and operatively connected to the locking mechanism such as to displace the first and second retaining members from the locked position to the unlocked position.

10. A frame assembly in combination with an implement as claimed in claim 9, wherein the implement is a plow.

11. A frame assembly for supporting an implement on a vehicle, the vehicle comprising a winch having a winch cable, and a mounting location located underneath the vehicle, the winch and the mounting location defining a first longitudinal distance, the frame assembly comprising:
   a) a longitudinally extending frame comprising a front portion and a rear portion, the frame comprising a winch cable supporting member and a winch cable connecting member, the winch cable supporting member and the winch cable connecting member being longitudinally spaced apart by a second longitudinal distance which is fixed during operation of the winch;

b) a locking mechanism located at the rear portion of the frame and configured to releasably engage the mounting location underneath the vehicle, the locking mechanism and the winch cable supporting member defining a third longitudinal distance, the third longitudinal distance being substantially equal to the first longitudinal distance;

c) a releasing mechanism mounted to the frame and operatively connected to the locking mechanism, the releasing mechanism being actionable to release the locking mechanism from the mounting location.

12. A frame assembly as claimed in claim 11, wherein the winch cable connecting member is located nearer the front portion of the frame than the winch cable supporting member.

13. A frame assembly as claimed in claim 11, wherein the winch cable connecting member is higher than the winch cable supporting member.

14. A frame assembly as claimed in claim 11, wherein the mounting location comprises at least one mounting rod.

15. A frame assembly as claimed in claim 14, wherein the locking mechanism comprises first and second side plates mounted to the rear portion of the frame, and first and second spring-loaded retaining members respectively mounted to the first and second side plates, the first and second retaining members being displaceable between a locked position and an unlocked position.

16. A frame assembly as claimed in claim 15, wherein the first and second retaining members are interdependent.

17. A frame assembly as claimed in claim 15, wherein the locking mechanism engages the at least one mounting rod when the frame assembly is moved upwardly.

18. A frame assembly as claimed in claim 15, wherein the releasing mechanism is connected to the first and second retaining members via articulated linkages.

19. A frame assembly for supporting an implement on a vehicle, the vehicle comprising a winch having a winch cable, and a mounting location located underneath the vehicle, the winch and the mounting location defining a first longitudinal distance, the frame assembly comprising:

a) a longitudinally extending frame comprising a front portion and a rear portion, the frame comprising a winch cable supporting member and a winch cable connecting member, the winch cable supporting member and the winch cable connecting member being longitudinally spaced apart by a second longitudinal distance which is fixed during operation of the winch, and the winch cable connecting member being located higher than the winch cable supporting member;

b) a locking mechanism located at the rear portion of the frame and configured to releasably engage the mounting location underneath the vehicle, the locking mechanism and the winch cable supporting member defining a third longitudinal distance, the third longitudinal distance being substantially equal to the first longitudinal distance;

c) a releasing mechanism mounted to the frame and operatively connected to the locking mechanism, the releasing mechanism being actionable to release the locking mechanism from the mounting location.

20. A frame assembly as claimed in claim 19, wherein the winch cable connecting member is located nearer the front portion of the frame than the winch cable supporting member.

21. A frame assembly as claimed in claim 19, wherein the locking mechanism engages the mounting location when the frame assembly is moved upwardly.

22. A frame assembly as claimed in claim 21, wherein the mounting location comprises at least one mounting rod.

23. A frame assembly as claimed in claim 22, wherein the locking mechanism comprising first and second side plates mounted to the rear portion of the frame, and first and second spring-loaded retaining members respectively mounted to the first and second side plates, the first and second retaining members being displaceable between a locked position and an unlocked position.

24. A frame assembly as claimed in claim 23, wherein the releasing mechanism is connected to the first and second retaining members via articulated linkages.

* * * * *